US012676833B2

(12) United States Patent
Nam et al.

(10) Patent No.: US 12,676,833 B2
(45) Date of Patent: Jul. 7, 2026

(54) FIREWALL SYSTEM FOR CONTROLLING DATA FLOW BETWEEN COMPUTING RESOURCES

(71) Applicant: Crowdstrike, Inc., Sunnyvale, CA (US)

(72) Inventors: Keehun Nam, Inver Grove Heights, MN (US); Tim Adams, Encinitas, CA (US)

(73) Assignee: Crowdstrike, Inc., Sunnyvale, CA (US)

(*) Notice: Subject to any disclaimer, the term of this patent is extended or adjusted under 35 U.S.C. 154(b) by 748 days.

(21) Appl. No.: 17/588,113

(22) Filed: Jan. 28, 2022

(65) Prior Publication Data

US 2023/0247001 A1 Aug. 3, 2023

(51) Int. Cl.
*H04L 9/00* (2022.01)
*H04L 9/40* (2022.01)

(52) U.S. Cl.
CPC ...... *H04L 63/0263* (2013.01); *H04L 63/0236* (2013.01); *H04L 63/20* (2013.01)

(58) Field of Classification Search
CPC .. H04L 63/0263; H04L 63/0236; H04L 63/20
See application file for complete search history.

(56) References Cited

U.S. PATENT DOCUMENTS

| | | | |
|---|---|---|---|
| 2006/0013136 A1* | 1/2006 | Goldschmidt | .......... H04L 47/10 370/235 |
| 2015/0358433 A1* | 12/2015 | Parthasarathy | ......... H04L 45/54 370/392 |

* cited by examiner

*Primary Examiner* — Syed M Ahsan

(74) *Attorney, Agent, or Firm* — Elliott, Ostrander & Preston, P.C.

(57) ABSTRACT

A firewall receives a flow of data from a first computing resource destined to a second computing resource and searches, in a memory, a prefix tree data structure, the prefix data structure comprising a linked plurality of nodes corresponding to normalized criteria for each of a plurality of rules, for any rule in the plurality of rules that applies to controlling the received flow of data between the first computing resource and the second computing resource. If the search is successful, a set of rules in the prefix tree data structure is identified that apply to controlling the received flow of data from the first computing resource to the second computing resource in response to the searching. One of those rules in the set is then selected to control the received flow of data from the first computing resource to the second computing resource. Action is taken with respect to the received flow of data, for example, allowing or denying transmission of the received flow of data from the first computing resource to the second computing resource, according to the selected rule.

14 Claims, 11 Drawing Sheets

200

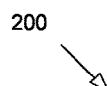

| |
|---|
| 205 BLOCK ALL TRAFFIC RELATED TO GOOGLE'S PUBLIC DOMAIN NAME SERVICE |

| |
|---|
| 210 BLOCK ALL TRAFFIC RELATED TO FREE DOMAIN NAME SERVICE PROVIDED BY CLOUDFLARE/APNIC |

| |
|---|
| 215 ALLOW ALL IPV4 UDP TRAFFIC IN BOTH DIRECTIONS |

| |
|---|
| 220 BLOCK ALL IPV4 TCP TRAFFIC IN BOTH DIRECTIONS DESTINED TO PRIVATE NETWORK WITH CLASS C IP ADDRESS 192.168.1.0/24 |

| |
|---|
| 225 BLOCK ALL TRAFFIC FROM APPLICATIONS IN /usr/local/bin |

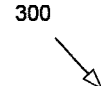

| ORDERED RULE | DIRECTION 330 | FAMILY 335 | PROTOCOL 340 | REMOTE PORT 345 | REMOTE IP 350 | LOCAL PORT 355 | LOCAL IP 360 | APPLICATION 365 | PRECEDENCE 370 | ACTION 375 |
|---|---|---|---|---|---|---|---|---|---|---|
| 305 | BOTH | IPV4 | UDP | * | 8.8.8.8/32 | 443 | * | * | 1 | DENY |
| 310 | BOTH | IPV4 | UDP | * | 1.1.1.1/32 | 443 | * | * | 2 | DENY |
| 315 | BOTH | IPV4 | UDP | * | * | * | * | * | 3 | ALLOW |
| 320 | BOTH | IPV4 | TCP | * | 192.168.1.0/24 | * | 192.168.1.0/24 | * | 4 | DENY |
| 325 | BOTH | * | * | * | * | * | * | /usr/local/bin/* | 5 | DENY |

FIREWALL SYSTEM FOR CONTROLLING DATA FLOW BETWEEN COMPUTING RESOURCES

CROSS REFERENCE TO RELATED DOCUMENTS

N/A

TECHNICAL FIELD

Embodiments of the invention relate to digital security systems, particularly with monitoring and controlling incoming and outgoing network traffic based on predetermined security rules.

BACKGROUND

A typical network firewall policy has hundreds or thousands of network firewall rules, or simply, "rules", where each rule is assigned or otherwise acquires a unique precedence. For any given network connection (referred to henceforth as a "data flow" or, simply, "flow"), it is possible that many if not all the rules could be applied ("matched") to the flow. When multiple rules are matched to a flow, generally, the rule with the higher or highest precedence is applied in deciding how to handle the flow. Therefore, network firewall rules are typically stored and evaluated in a sequential manner in order to guarantee that the rule with the highest precedence is applied to the flow.

There are a number of drawbacks to the above-described approach, including: 1) if a flow is received and no rules apply to the flow, every rule and all their criteria nevertheless would have been evaluated at a large computational cost, 2) even if a rule is found that applies, but that rule is located far into the sequential order of rules, many of the rules and all their criteria are evaluated at large computational cost, and 3) a criterion that is common across multiple rules is evaluated again, perhaps many times, even if it has already been evaluated in connection with a previous rule.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 shows a list of rules according to a typical firewall policy.

FIG. 3 shows normalized criteria for the list of rules shown in FIG. 2.

DETAILED DESCRIPTION

Figure 1:
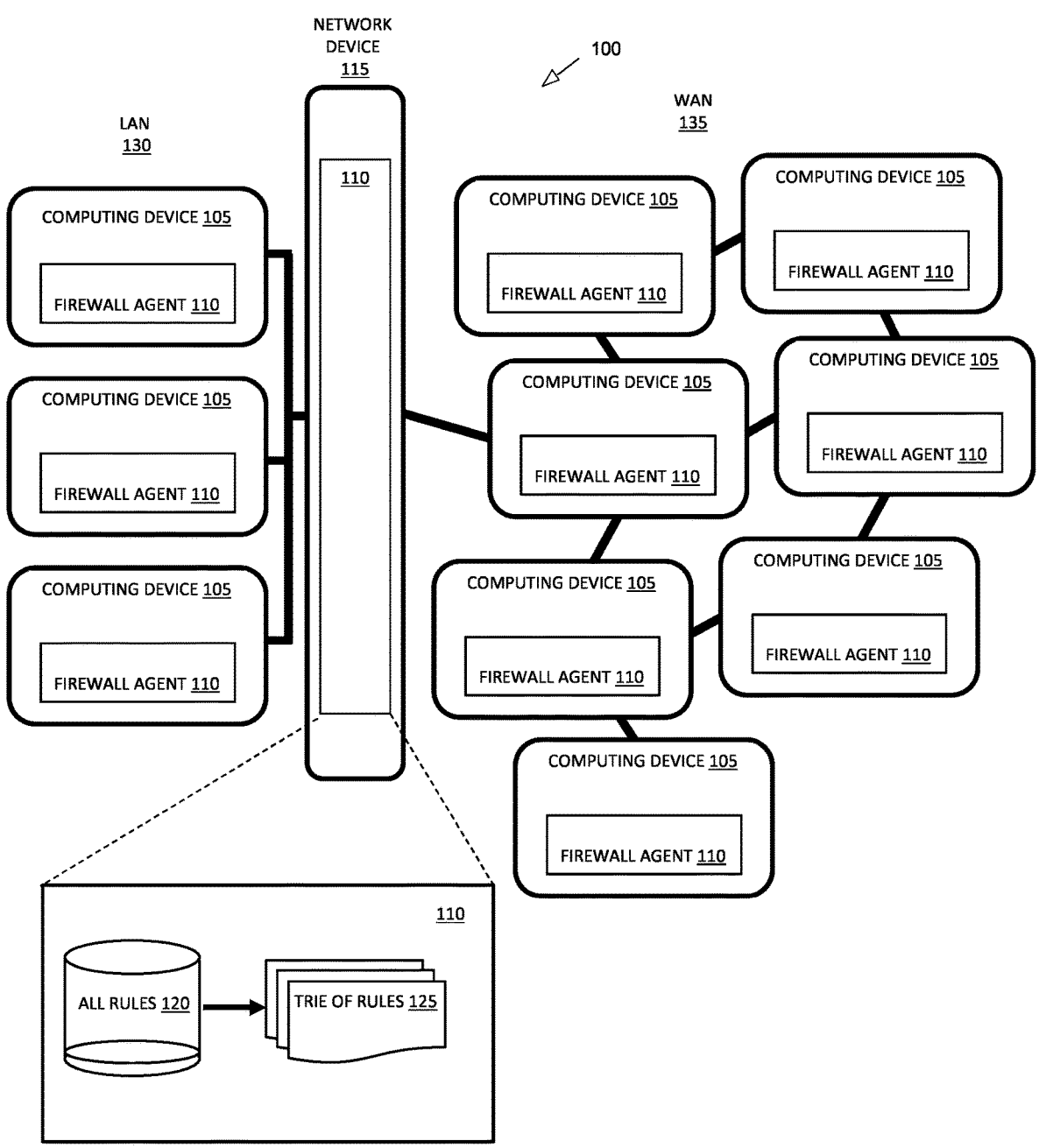
FIG. 1 shows a diagram of connected computing devices between which a firewall may control the flow of traffic according to embodiments described herein.

The embodiments described herein can be used in firewall devices, or simply, firewalls, e.g., network firewalls. Firewalls are security devices used to monitor and control, e.g., stop or mitigate, unauthorized access to private networks (i.e., intranets) connected to the Internet. However, the same functionality can be used to stop or mitigate unauthorized access to any computing resource, including a hardware computing resource or device such as a desktop computer, laptop, mobile device, peripheral device, data storage device, or components therein, or a software computing resource such as an operating system, a software application, a cloud-hosted application, executing on a hardware computing device.

The only data traffic, or data flows, allowed on the network, or to reach the computing resource, is defined via a set of one or more rules that comprise a firewall policy. Any other traffic attempting to access the network or computing resource is blocked or quarantined. Network firewalls sit at the front line of a network, acting as a communications liaison between internal devices inside the firewall and external devices outside the firewall.

A firewall can be configured so that any data entering or exiting the network or computing resource must pass through the firewall. The firewall accomplishes this by examining each incoming message and allowing those that meet defined criteria to pass through, while rejecting those that fail to meet defined criteria. When properly configured, a firewall allows users to access any of the computing resources they need while simultaneously keeping out unwanted users, hackers, viruses, worms or other malicious programs trying to access the protected network.

Firewalls can be implemented in either hardware or software. In addition to limiting access to a protected computer and/or network, a firewall can log all traffic coming into or leaving a network and manage remote access to a private network through secure authentication certificates and logins. Hardware firewalls may be implemented either as standalone products, or more commonly, as a built-in component of a router or other networking device as a part of a security system and network configuration. Hardware firewalls typically include physical network ports that allow connections to multiple systems. Software firewalls are typically installed on a computer or provided by an operating system (OS) or network device manufacturer. They can be customized and generally provide a smaller level of control over functions and protection features to protect a system from standard control and access attempts.

The embodiments described herein can be used in different types of firewalls, such as those described below, to secure networks by parsing information to be passed through the network and preventing any harmful information from passing through the network.

Application-layer firewalls can be implemented as a hardware appliance, software filter, or server plug-in. Application-layer firewalls layer security mechanisms on top of defined applications, such as File Transfer Protocol (FTP) servers, and defines rules for connections, such as Hyper-Text Transfer Protocol (HTTP) connections. Rules are created for each application, to help identify and block attacks to a network. A benefit of application layer filtering is that it can understand certain applications and protocols such as File Transfer Protocol (FTP), Domain Name System (DNS), or Hypertext Transfer Protocol (HTTP). This allows it to identify unwanted applications or services using a non-standard port, or to detect if an allowed protocol is being abused. It can also provide unified security management including enforced encrypted DNS and virtual private networking.

Packet filtering firewalls examine every data and/or control packet transferred between computers that passes through the network and accepts or denies each packet as defined by rules configured by a user. The firewall maintains an access control list which dictates what packets will be looked at and what action should be applied, if any. Three basic actions regarding the packet filtering consist of a silent discard, discard with notification, for example, via an Internet Control Message Protocol (ICMP) message or Transmission Control Protocol (TCP) reset response to the sender, and forward to the destination or next hop in the network toward the destination. Packets may be filtered by source and destination network addresses, e.g., source and destination Internet Protocol (IP) addresses, transport protocol type, e.g., Transmission Control Protocol (TCP) or User Datagram Protocol (UDP), and transport layer source and destination ports. Much of Internet communication to-date uses either Transmission Control Protocol (TCP) or User Datagram Protocol (UDP) in conjunction with well-known ports, enabling firewalls to distinguish between specific types of traffic such as web browsing, remote printing, email transmission, and file transfers.

Circuit-level firewalls apply to security mechanisms once a User Datagram Protocol (UDP) or Transmission Control Protocol (TCP) connection has been established between two computing devices or computing resources. Once the connection is established, packets are exchanged directly between hosts or client devices without further oversight or filtering. On so doing, circuit-level firewalls maintain knowledge of specific conversations between endpoints by remembering which port number the two IP addresses are using at layer 4 (transport layer) of the OSI model for their conversation, allowing examination of the overall exchange between the endpoints.

Proxy server firewalls check all messages that enter or leave a network, and then hide the real network addresses from any external inspection.

Next Generation Firewalls (NGFW) filter traffic moving through a network. The filtering is determined by the applications or traffic types and the ports to which they are assigned. Next-generation firewall provides a wider range of inspection at the application layer, extending deep packet inspection functionality to include, but not limited to, web filtering, intrusion prevention systems, user identity management, and web application firewalls.

Stateful firewalls classify traffic based on the destination port, and track packets for every interaction between internal connections. Stateful firewalls increase access control granularity in that interactions are not merely defined by port numbers and protocol types.

Multiple firewalls of different types may be implemented in, and operate concurrently, in a network, thereby offering multiple layers of protection in connection with the embodiments described herein.

With reference to the network 100 illustrated in FIG. 1, firewalls may be a network-based or a host-based system. Network-based firewalls can be located anywhere within a Local Area Network (LAN) 130 or Wide Area Network (WAN) 135. The firewalls may be implemented as a software application or software appliance running on general-purpose hardware, such as a firewall agent 110 running on a computing device 105, as a hardware or computer appliance running on special-purpose hardware such as firewall agent 110 running on a network device or network appliance 115, or as a virtual appliance running on a virtual host controlled by a hypervisor.

A computer appliance is a computer with software or firmware that is specifically designed to provide a specific computing resource. Such devices are generally known as appliances because of the similarity in role or management to a home appliance, which are generally closed and sealed, and are not serviceable by the user or owner. The hardware and software are delivered as an integrated product and may even be pre-configured before delivery to a customer, to provide a turn-key solution for a particular application. Unlike general purpose computers, appliances are generally not designed to allow the customers to change the software and the underlying operating system, or to reconfigure the hardware.

A software appliance is generally known as a software application combined with minimal operating system (OS) software to run optimally on industry-standard hardware (typically a server) or in a virtual machine. It is a software distribution or firmware that implements a computer appliance.

Virtual appliances are a subset of software appliances designed according to a particular packaging format and for a specific target platform. As such, a virtual appliance is a virtual machine image designed to run on a specific virtualization platform, while a software appliance is often packaged in a more generally applicable image format that supports installations to physical machines and multiple types of virtual machines. Installing a software appliance to a virtual machine and packaging that into an image creates a virtual appliance.

A typical network firewall policy has hundreds or thousands of network firewall rules, or simply, "rules", where each rule is assigned or otherwise acquires a unique precedence. For any given network connection (referred to henceforth as a "data flow" or, simply, "flow"), it is possible that many if not all the rules could be applied ("matched") to the flow. When multiple rules are matched to a flow, generally, the rule with the higher or highest precedence is applied in deciding how to handle the flow. Therefore, network firewall rules are typically stored and evaluated in a sequential manner in order to guarantee that the rule with the highest precedence is applied to the flow. However, there can be large computational costs associated with doing so.

As briefly mentioned above, network firewall rules are typically stored and evaluated in a sequential manner in order to guarantee that the rule with the highest precedence is applied to the flow. There are a number of drawbacks to this approach, including: 1) if a flow is received and no rules apply to the flow, every rule and all their criteria nevertheless would have been evaluated at a large computational cost, 2) even if a rule is found that applies, but that rule is located far into the sequential order of rules, many of the rules and all their criteria are evaluated at large computational cost, and 3) a criterion that is common across multiple rules is evaluated again, perhaps many times, even if it has already been evaluated in connection with a previous rule.

A common approach to minimizing the computational costs is to cache the results of the evaluation of each criterion of a rule with a given flow ("memoization") and reuse the cached results whenever possible. Thus, when checking a flow against a criterion in a rule that has already been evaluated as part of previous rule, instead of re-evaluating that criterion, the cached result from the previous evaluation is used. However, this is not an ideal technique because both managing and querying a cache carries with it the added overhead at runtime as well as the potential for errors. What is needed is an approach that avoids memoization and the complexity that comes with it.

With reference to FIG. 1, the embodiments described herein read or otherwise have access to a plurality of network firewall rules 120, for example, residing in a database. The rules may be input by one or more users that have direct access to the database or may be received from a cloud-based service provider on a periodic basis and updated to the database. The embodiments organize the rules into a prefix-sharing tree data structure (or simply "prefix tree data structure") 125 in a memory accessible to a firewall device or agent 110, where rules that share a common prefix of criteria, and in particular, where nodes in the prefix tree data structure that represent a common criterion among the rules, are combined or grouped together. A prefix tree data structure is also called a digital tree, or trie data structure, or simply, "trie". The main benefit of a trie is derived from the fact that if a criterion represented by or associated with a node in the trie evaluates to "false" for a flow (meaning that criterion does not exist in the flow), then the entire section (all branches) of the tree data structure below that node in the trie can be rejected or ignored without further evaluation. By rejecting or ignoring entire sections of the trie, the number of criteria that are evaluated is significantly reduced, and thus the computational cost associated with evaluating a flow against all the rules in the firewall policy is significantly reduced.

A trie is a type of search tree, a tree data structure used for locating specific keys (rules) from within a set of keys (rules). These keys (rules) are most often strings, with links between nodes in the tree defined not by the entire key (rule), but by individual characters or criterion that make up the key (rule). In order to access a key (i.e., to recover its value, change it, or remove it), the trie is traversed, for example, depth-first, following the links between nodes which represent the characters or criteria in the key (rule). Depth-first trie traversal involves a search algorithm starting at a root node (selecting some arbitrary node as the root node in the case of a graph) and exploring as far as possible along each branch before backtracking.

Nodes in the trie do not store their associated key (rule). Instead, a node's position in the trie defines its part (one of the characters or criterion) of the key (rule) with which it is associated. This distributes the value of each key (rule) across the tree data structure and means that not every node necessarily has an associated value, or the associated value of a node may be a null value, or a don't care value.

In a prefix-tree data structure, all the children nodes of a parent node in the tree data structure have a common prefix of the string associated with that parent node, and the root is associated with the empty string. The task of storing data accessible by its prefix can be accomplished in a memory-optimized way by employing a radix tree, according to embodiments.

Though tries can be keyed by character strings, they need not be. The same algorithms can be adapted for ordered lists of any underlying type, e.g., permutations of alphanumeric digits or other criterion.

Figure 4:
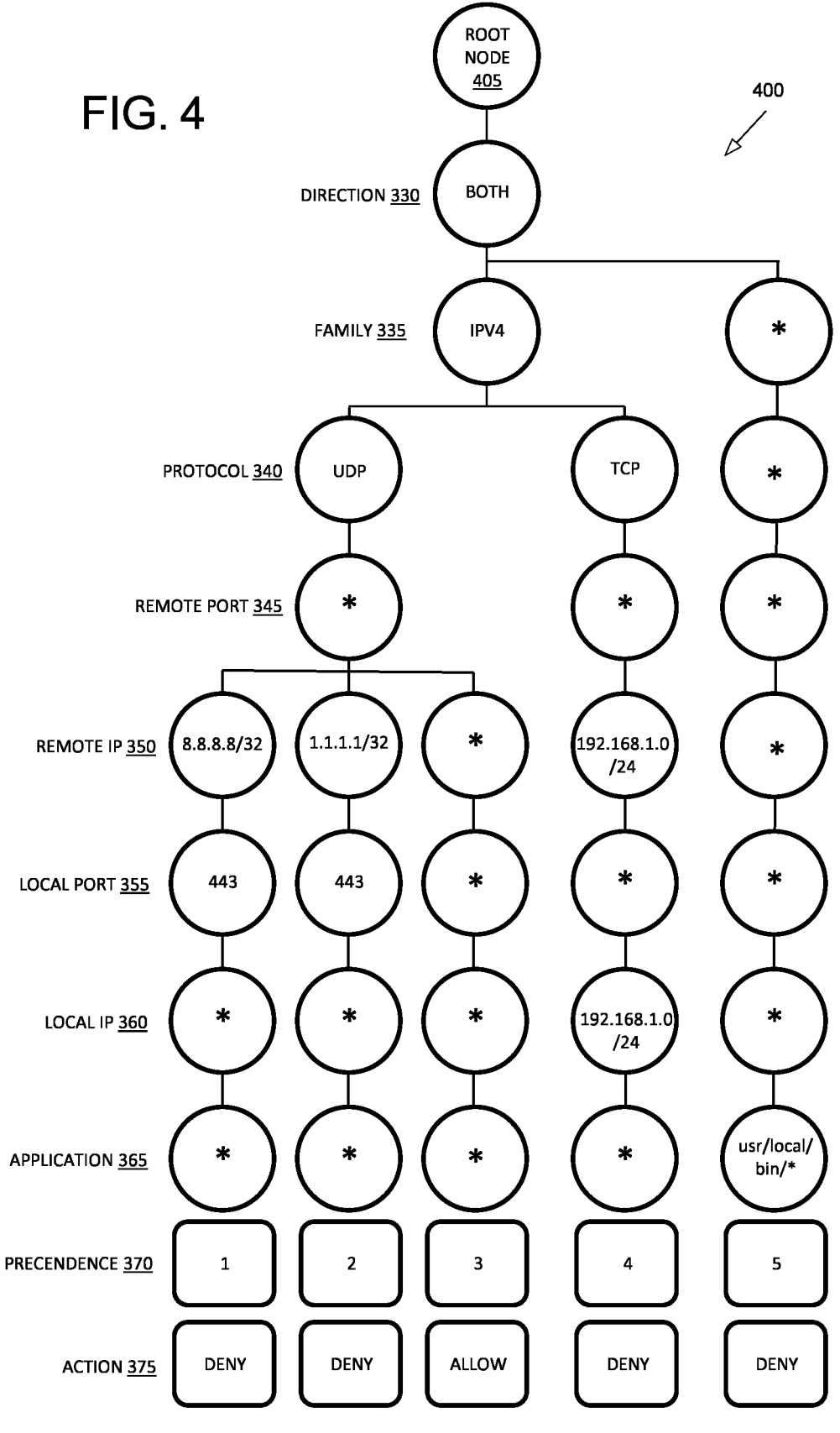
FIG. 4 shows a prefix tree data structure, or trie data structure, in which the normalized criteria for the list of rules shown in FIG. 2 are organized for efficient searching of the trie.
Figure 5:
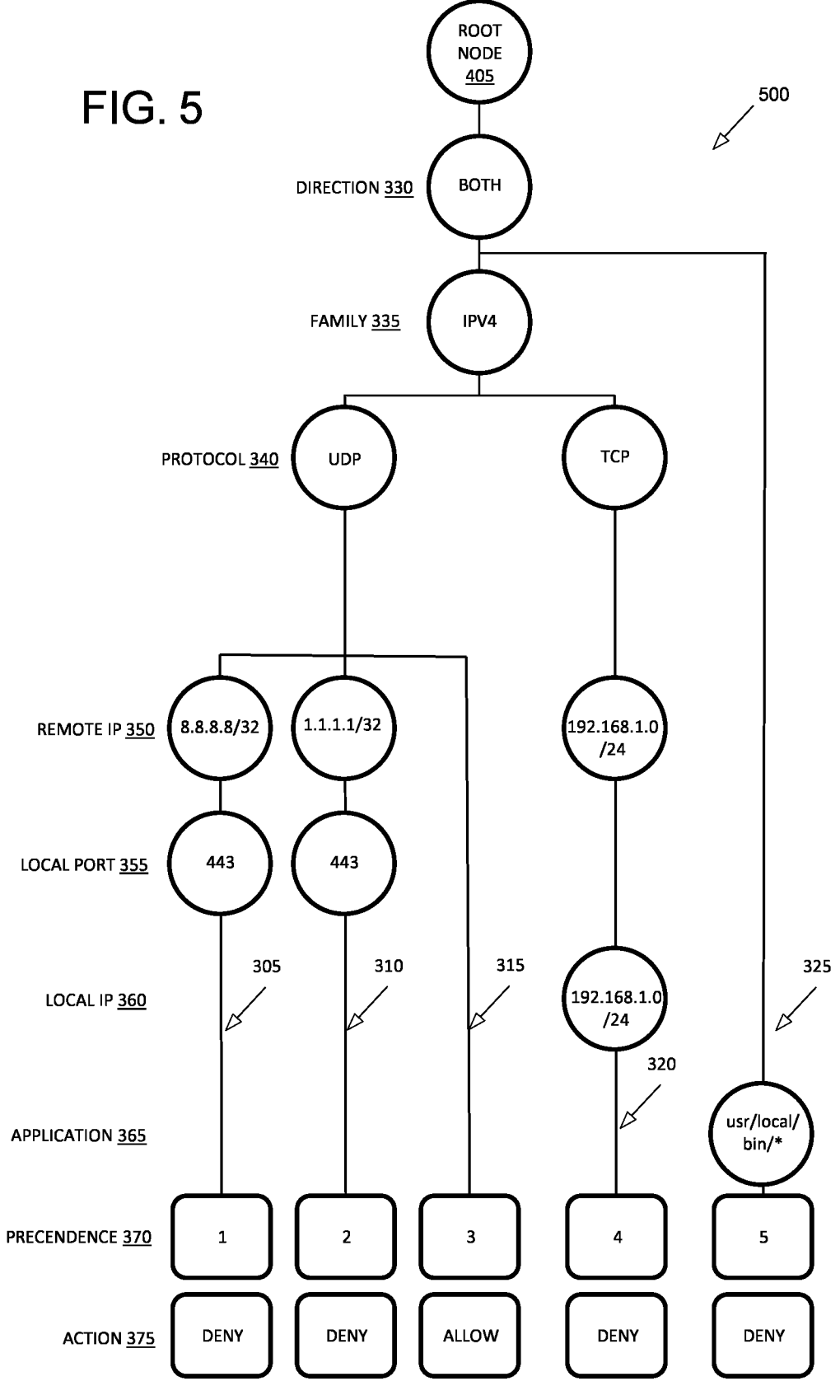
FIG. 5 shows an optimized prefix tree data structure, or trie data structure, in which the normalized criteria for the list of rules shown in FIG. 2 are organized for efficient searching.
Figure 6:
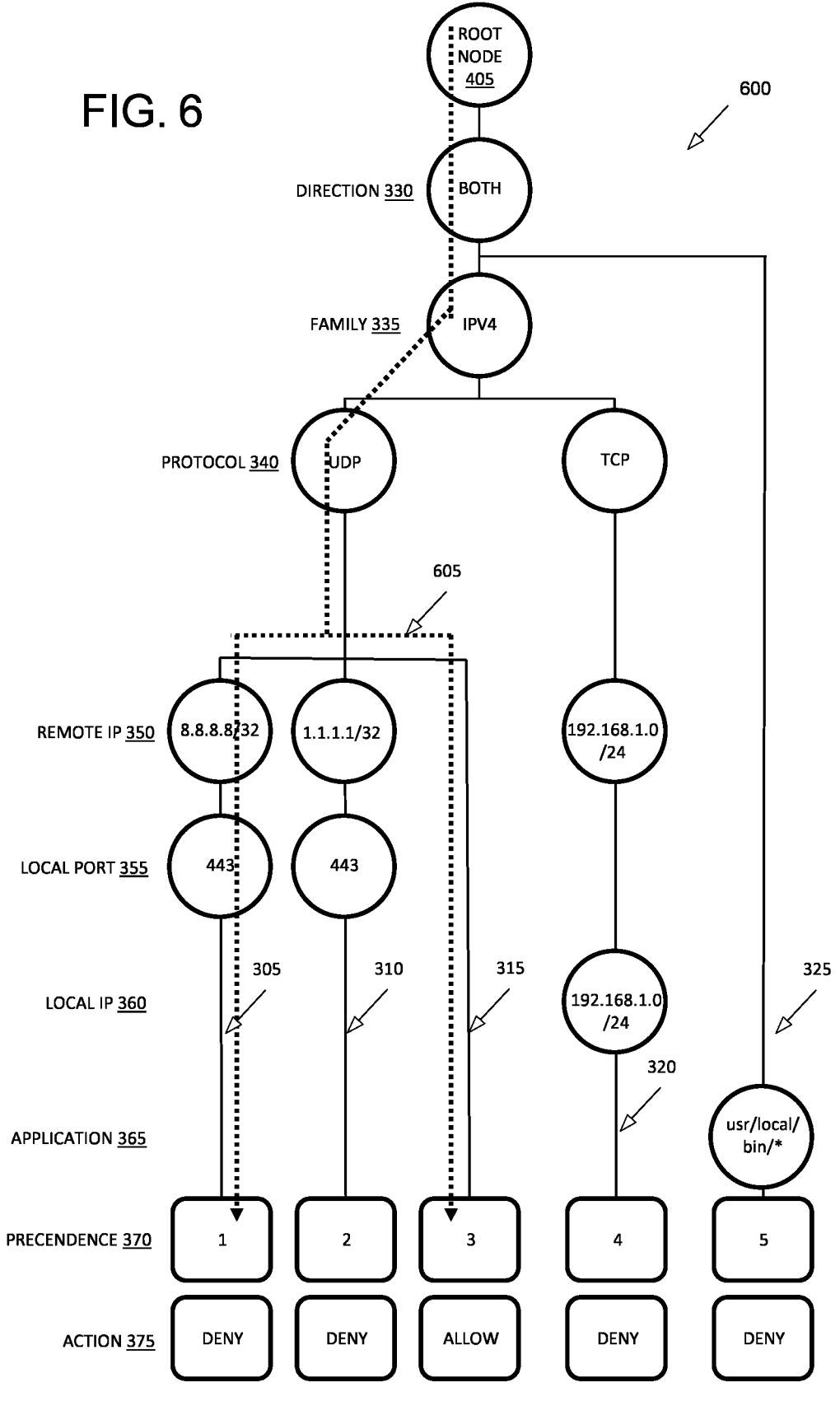
FIG. 6 depicts a search for, and identification of, multiple rules in the prefix tree structure that apply to a received flow of data according to the embodiments described herein.
Figure 10:
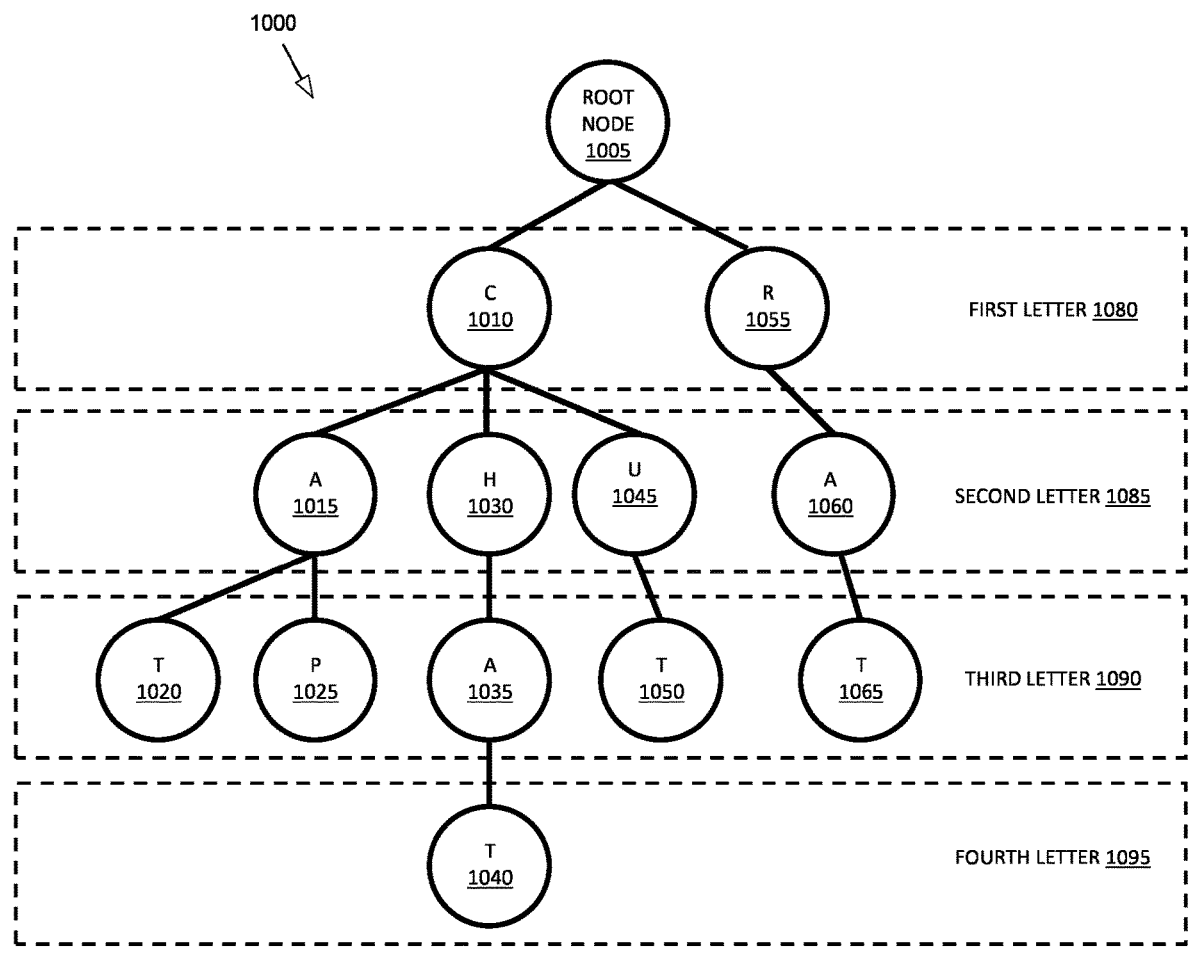
FIG. 10 shows an example trie data structure.

A simple pre-fix tree data structure, or trie, is illustrated by the examples in FIGS. 4-6, in connection with the below described embodiments. However, a simpler example of a trie 1000 is illustrated in FIG. 10. The words "cat", "cap", "chat", "cut", and "rat" are the keys (rules) stored in the trie 1000, their constituent parts (their characters or letters) organized as nodes in the trie as follows. Each word forms separate branches in the trie where each of its letters in the word in the order of left to right are represented as nodes in the trie in the order of top to bottom. Starting at a root node 1005, for every letter in a word, the trie checks to see if a node representing that letter already exists at the current point in the trie. If a node representing a letter exists, for example, node 1010 for the letter "C" in the word "cap" due to the letter "C" in the word "cat" having been added to the trie already, then the node 1010 for letter "C" at the first level (first letter 1080) in the trie is reused for the word "cap". If there is not already a node for a letter in the trie, for example, if the letter "R" in the word "rat" has no node in the trie because there are no previous words in the trie that have the letter "R" as their first letter, then a new node 1055 is created at the first level (first letter 1080) in the rightmost branch of the trie for the letter "R".

In this manner, for example, the letters "C", "A", and "T", are added at nodes 1010, 1015 and 1020, respectively, as the first letter 1080, second letter 1085 and third letter 1090, to represent the word "cat" in the leftmost branch in the trie. Adding the next word "cap" to the trie is accomplished as follows. Starting at the root node 1005, for every letter in the word "cap", the trie checks to see if a node representing that letter already exists at the current point in the trie. If a node representing a letter exists, for example, node 1010 for the letter "C" in the word "cap" already exists due to the letter "C" in the word "cat" having already been added to the trie, then the node 1010 for letter "C" at the first level (first letter 1080) in the trie is reused for the word "cap". Likewise, the letter "A" in the word "cap" already exists in the trie due to the letter "A" in the word "cat" having already been added to the trie. So, node 1015 for the letter "A" at the second level (second letter 1085) in the trie is re-used for the word "cap. The letter "P" does not exist in the trie, and so it is added at node 1025 as the third level (third letter 1090) in the word "cap". In the same manner, the letters "C", "H", "A", and "T" are represented by nodes 1010, 1030, 1035 and 1040 as the first letter 1080, second letter 1085, third letter 1090 and fourth letter 1095 in the trie to form the word "chat". Likewise, the letters "C", "U", and "T" are represented by nodes 1010, 1045 and 1050 as the first letter 1080, second letter 1085 and third letter 1090 in the trie and comprise the word "cut". Finally, the letters "R", "A" and "T" are represented by nodes 1055, 1060 and 1065 as the first letter 1080, second letter 1085 and third letter 1090 in the trie for the word "rat".

When executing a search in this example trie with user input, the entire left portion of the trie will be ignored if the user enters anything other than a "C" as the first letter.

Likewise, if the first letter of the user input is neither a "C" nor an "R", then the entire trie can be evaluated to "false" after evaluating only two nodes, which significantly reduces the computational costs of the search for a word in the trie.

The embodiments described herein contemplate that a firewall rule, much like words in the above trie example, can be decomposed into one or more criterion, much like words can be decomposed into letters in the above trie example, and grouped together with other firewall rules. Moreover, by imposing an ordering to the criteria, which are inherently unordered in firewall rules, the rules can be formed into an organized and ordered sequence of criterion in a trie. In short, just as a word is represented by a number of letters sequenced according to a common spelling, a firewall rule is a sequence of criteria. Similarly, just as the syntax for a well-formed sentence or phrase in a particular language is represented by an arrangement of words, a firewall rule is a sequence of criteria. Therefore, a trie can be constructed that represents all the firewall rules in a policy, according to the embodiments disclosed herein, and then the trie can be searched for a rule or rules that match or apply to a flow of data received at the firewall so that a decision can be made to take some action regarding the flow of data, e.g., forward or discard or block the flow of data.

Thus, according to embodiments further disclosed below, a firewall receives a plurality of rules for controlling a flow of data between computing resources, parses each of the plurality of rules into a respective sequence of criteria, orders the respective sequence of criteria for each of the plurality of rules, and stores the plurality of rules in a memory, organized as a prefix tree data structure comprising a linked plurality of nodes corresponding to the ordered sequence of criteria for each of the plurality of rules.

The embodiments further receive a flow of data from a first computing resource that is destined to a second computing resource and search the prefix tree data structure for any rule in the plurality of rules that applies to controlling According to the embodiments disclosed herein, the rule in the set of rules that is selected to control the received flow of data from the first computing resource to the second computing resource is selected based on an associated precedence value for the rule. For example, the rule with the higher or highest associated precedence value compared to other rules in the set provides the basis for selecting a particular rule in the set over other rules in the set.

According to embodiments, the associated precedence for each of the plurality of rules is stored in a leaf node of the linked plurality of nodes corresponding to each of the plurality of rules to avoid the need for another lookup. Alternatively, the precedence value could be stored in a different manner, such as a separate hash table, or encoded as a property of the leaf criterion nodes. Likewise, the associated action for each of the plurality of rules (e.g., forwarding or discarding a data flow) may be stored in a leaf node of the linked plurality of nodes corresponding to each of the plurality of rules, or stored in a different manner, such as a separate hash table, or encoded as a property of the leaf criterion nodes.

The described embodiments directly result in a more compact and efficient memory usage, reduced data storage requirements, and reduced computational resources and computational time, to store and search the prefix tree structure for applicable rules, thus allowing real-time, wire-speed security processing (inspecting and discarding or forwarding) of incoming data flows.

Because the criteria in a firewall rule is not inherently numbered or ordered (it does not matter appreciably if one criterion is evaluated before or after another criterion), ordering of the criteria can be arbitrary. Any ordering, in theory, will work for the purposes of matching or applying firewall rules with data flows. However, the order in which criteria are added to the trie does impact how compact the trie is.

For example, take the following firewall rules in Table 1 below:

TABLE 1

| Protocol 1150 | Direction 1155 | Family 1160 | Local IP | Local Port | Remote IP 1175 | Remote Port 1180 | Application 1185 |
|---|---|---|---|---|---|---|---|
| 6 (TCP) | OUT | * | * | * | * | 80 (HTTP) | Safari |
| 6 (TCP) | OUT | * | * | * | * | 80 (HTTP) | Firefox |
| 6 (TCP) | OUT | * | * | * | * | 80 (HTTP) | Chrome |
| 6 (TCP) | OUT | * | * | * | * | 21 (FTP) | FTP Client |

Note:
all wildcard criterion ("*") are ignored when constructing the trie the received flow of data from the first computing resource to the second computing resource. If the search is successful, a set of rules is identified in the prefix tree data structure that applies to controlling the received flow of data from the first computing resource to the second computing resource. A rule in the set of rules is then selected to control the received flow of data from the first computing resource to the second computing resource, and the received flow of data from the first computing resource to the second computing resource is then controlled according to the selected rule, e.g., the received flow of data is forwarded or blocked or discarded.

Normalization of the criteria for each of the plurality of rules, for example, the identical ordering of the respective sequence of criterion for each of the plurality of rules, provides for optimize searching of the prefix tree data structure for any rule in the plurality of rules that applies to controlling the flow of data between computing resources.

Depending on the order or sequence in which the nodes representing separate criterion comprising the rules are added to the trie, the size of the trie could significantly differ. The order of the criterion for the four rules set forth in the above table is as follows:

1) protocol 1150, as in OSI Transport Layer Protocol,
2) direction of data flow 1155,
3) family (or version) of OSI Network Layer Protocol 1160,
4) local IP 1165, as in the destination IP address for a data flow received at or to be forwarded to an IP-addressable computing resource, or the source IP address for a data flow transmitted from or to be forwarded on behalf of an IP-addressable computing resource,
5) local port 1170, as in OSI Transport Layer well-known destination port number for a data flow received at or to be forwarded to the local port, or the OSI Transport Layer source port for a data flow transmitted from or to be forwarded on behalf of a computing resource, 6) remote IP 1175, as in the source IP address for a data flow received at or to be forwarded from an IP-addressable computing resource, or the destination IP address for a data flow transmitted to or to be forwarded to an IP-addressable computing resource, 7) remote port 1180, as in OSI Transport Layer source port number for a data flow received at or to be forwarded to the local port, or the OSI Transport Layer well-known destination port for a data flow transmitted to or to be forwarded to a computing resource, and 8) OSI Application layer (e.g., application, or filename of application) 1185, as in the application layer that is used by end-user software such as web browsers and email clients.

Figure 11A:
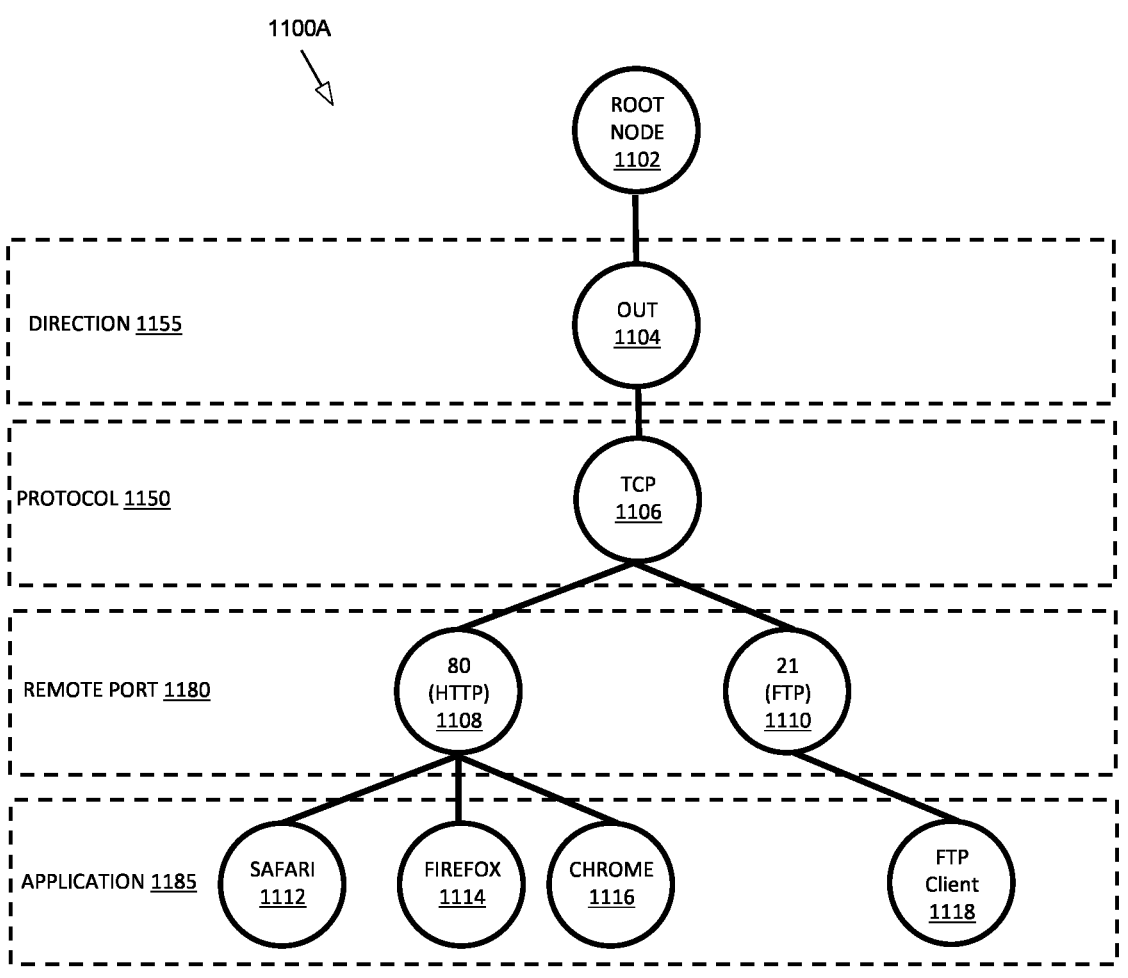
FIG. 11A shows an example trie data structure in which rules are organized according to an ordered sequence of criterion that comprise the rules.

FIG. 11A shows a trie 1100A in which the above eight criteria are added to the trie in an order or sequence that is different than as outlined in the table. There is a sequence of eight criterion in the rules, but those criteria for which the value for all rules is the wildcard criterion ("*", meaning the values for those criteria is "don't care" or "does not matter") can be ignored when constructing the trie, to save space in the trie. Thus, only nodes representing the criteria for 1) protocol 1150, 2) direction 1155, 7) remote port 1180, and 8) application layer (filename) 1185 are created in trie 1100A; the remaining criterion 3-6 are not added to the trie, since the values of those criteria for all rules does not matter. Moreover, the sequence of criteria is re-ordered when the criteria are added to the trie, so that the second criterion in the rules—the direction criterion 1155—is represented by nodes at the first level in the trie, then the first criterion in the rules—the protocol criterion 1150—is represented by nodes at the second level in the trie, followed by the seventh criterion—remote port criterion 1180—represented by nodes at the third level in the trie, and, finally, the eighth criterion—the application criterion 1185—is represented by nodes at the fourth level in the trie 1100A. Since this is a prefix tree, the data structure collapses or combines nodes that represent criteria having the same value, where possible. Thus, since the direction criterion 1155 for all four rules is the value "OUT", a single node 1104 can represent this value at the first level in the trie. Similarly, since the protocol criterion 1150 is the same for all four rules with the value "TCP", a single node 1106 can represent this value at the second level in the trie. However, since there are two different values for the remote port criterion 1180 across the four rules, with the value "HTTP" shared by the first three rules, and the value "FTP" associated with the last rule, two respective nodes 1108 and 1110 are needed to represent these values at the third level in the trie. Finally, there are four different values for the application layer criterion 1185, a different application for each of the four rules, so four respective nodes 1112, 1114, 1116 and 1118 are needed to represent the values of the application programs "Safari", "Firefox", "Chrome", and "FTP" at the fourth level in the trie. As a result of the reordering the criteria before adding them to the trie 1100A, a total of eight nodes, excluding root node 1102, are needed to represent all the values of the criteria that make up all the rules in the set of rules in Table 1.

Figure 11B:
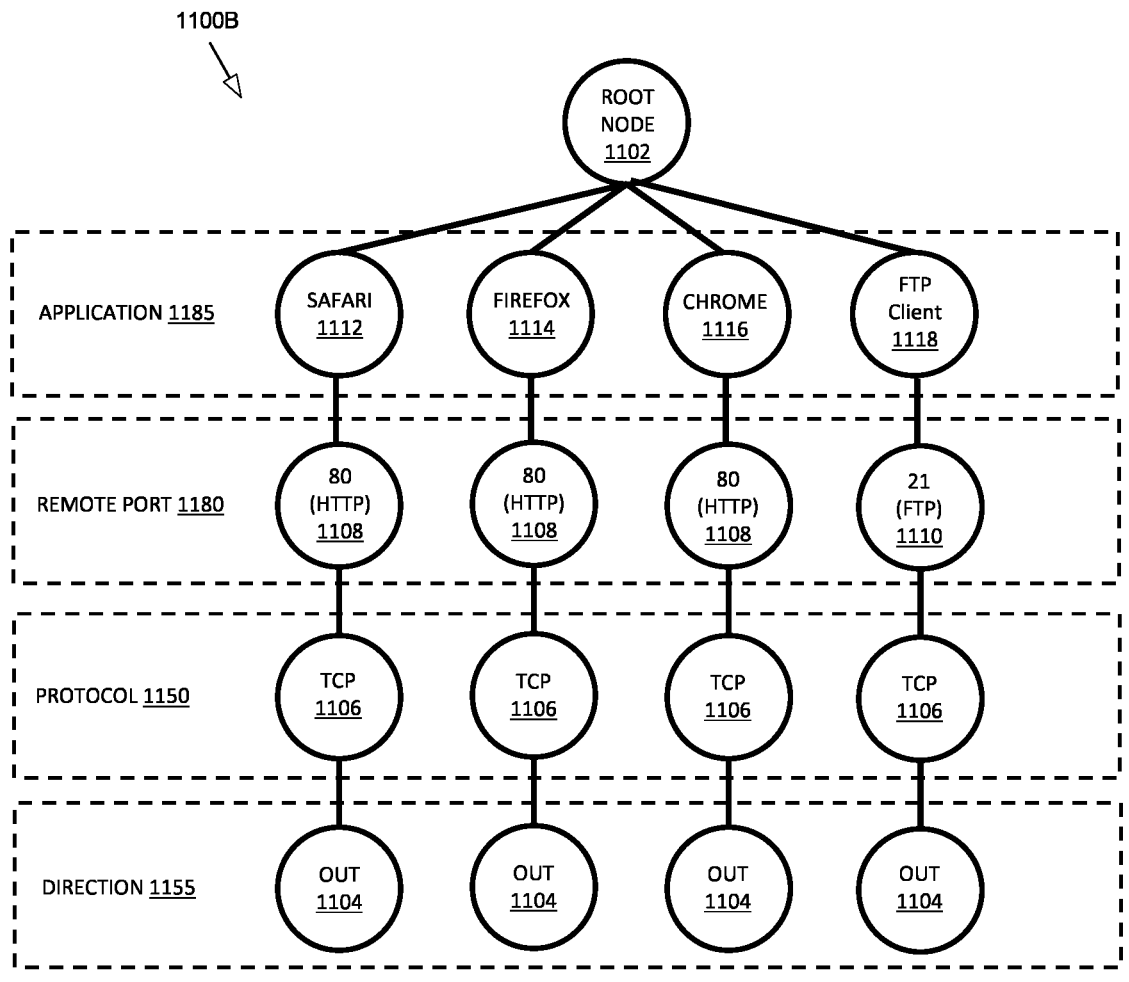
FIG. 11B shows an example trie data structure in which rules are organized according to a different ordered sequence of criterion that comprise the rules.

Contrast the above example trie 1100A illustrated with reference to FIG. 11A with the following trie example 1100B illustrated with reference to FIG. 11B. FIG. 11B shows a trie 1100B in which the eight criteria for each of the rules in Table 1 are added to the trie in a different order or sequence as outlined in the table, and in a different order or sequence as entered to the trie 1100A. Like trie 1100A, those criteria for which the value for all rules is the wildcard criterion ("*") are ignored when constructing the trie, to save space in the trie. Thus, only nodes representing the criteria for 1) protocol 1150, 2) direction 1155, 7) remote port 1180, and 8) application layer (filename) 1185 are created in trie 1100B; the remaining criteria 3-6 are not added to the trie. The sequence of criteria is re-ordered when the criteria are added to the trie, so that the eighth criterion in the rules—the application layer criterion 1185—is represented by nodes at the first level in the trie, then the seventh criterion in the rules—the remote port criterion 1180—is represented by nodes at the second level in the trie, followed by the first criterion—protocol criterion 1150—represented by nodes at the third level in the trie, and, finally, the second criterion—the direction criterion 1155—is represented by nodes at the fourth level in the trie 1100B. Since this is a prefix tree, the data structure collapses or combines nodes that represent criterion having the same value, where possible. However, since the application layer criterion 1185 for all four rules has a different value for each rule, four different nodes 1112, 1114, 1116, and 1118 are needed to represent these different values at the first level in the trie. Since none of the criterion that follows in the trie shares the same prefix at the first level of the trie, each criterion is represented by a different node, even though, as an example, the value of the protocol criterion 1150 represented by nodes 1106 at the third level in the trie share the same value of "TCP". Similarly, there are three nodes with the same value of "HTTP" for the remote port criterion 1180 represented by nodes 1108, and an additional node 1110 for the different value of "FTP" for the remote port criterion 1180, at the second level of the trie, and there are four nodes for the same value of "OUT" for the direction criterion 1155 represented by nodes 1104 at the fourth level of the trie. As a result of the reordering the criteria before adding them to the trie 1100B, a total of sixteen nodes are needed, excluding root node 1102, to represent all the values of the criteria that make up all the rules in the set of rules in Table 1.

Thus, it is demonstrated that the compactness of the trie 1100A versus the compactness of trie 1100B depends on the sequence of criteria used in the tries, which may be the same or different than the sequence of criteria used to express the rules outside the trie. Notice in the trie 1100B in FIG. 11B that there is a lot of duplication of nodes representing the remote port criterion 1180, the protocol criterion 1150, and the direction criterion 1155. Because the trie 1100B only collapses the common criteria at the beginning of the trie, where, or so long as the value of the prefix in the parent nodes is common, and not at the end of the trie, carefully arranging or configuring the order of the criteria in which to add the criteria to the trie can greatly improve the compactness of the trie, and therefore improve the efficiency in and corresponding time required to search the trie.

Embodiments disclosed herein configure the order of the criterion to be added to the trie based on empirical analysis of actual firewall rules created by actual users of firewall policies. The efficiency gained based on analysis of actual firewall rules is substantial: in testing, the best-case ordering of criterion yielded a 41% reduction in the trie size compared to the worst-case ordering. One benefit derived from a well-ordered (relatively compact) trie is that if a criterion node evaluates to "false" for a flow, then the entire section of the trie below that node can be ignored or rejected without further evaluation. By ignoring or rejecting entire sections of the trie, the number of criteria that are evaluated can be drastically reduced. An additional benefit is that by sharing or combining criterion nodes where possible, repetitive evaluation of the same criterion between multiple rules is minimized. Because many rules could contain the same criteria, minimizing the number of times those criteria are evaluated can have a big impact to runtime performance both in terms of CPU and network throughput.

The first rule that the search algorithm for the trie matches to a received flow of data is not necessarily, and in fact, likely is not, the rule with the highest precedence amongst all the rules that may match the received flow. Therefore, the search algorithm does not stop its search of the trie when the first match is found. Instead, the search algorithm should search the entire trie for all matches. Then, amongst all the matching rules, the rule with the higher (or highest) precedence value is selected as the matched rule for a flow. However, because of the trie's structure, and the order or sequence in which criteria are added to the trie, the search algorithm eliminates searching large parts of the trie structure with the negative or "false" evaluation of a single node, thereby greatly increasing the speed with which a decision can be made by the firewall to allow the data flow to be forwarded to a destination device or blocked and/or discarded.

Figure 7:
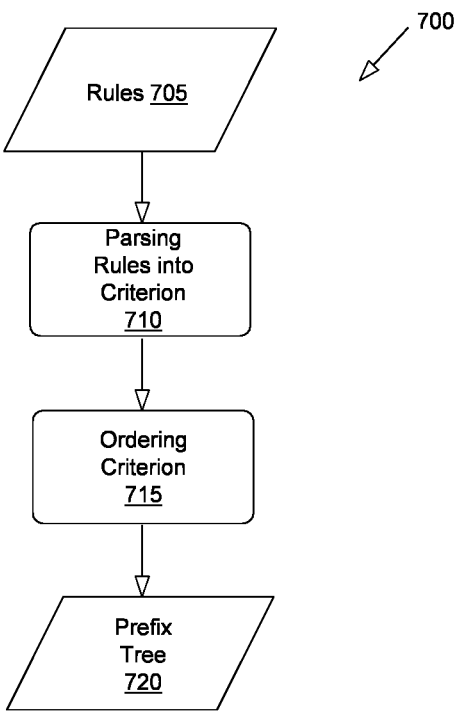
FIG. 7 is a flowchart for creating a prefix tree structure comprising normalized criteria obtained from a list of rules such as those shown in FIG. 2.

With reference to FIG. 7, the process for creating a trie of firewall rules is described with reference to flowchart 700. At block 705, a plurality of firewall rules is received or accessed. A firewall policy may comprise hundreds or thousands of firewall rules. Firewall rules come in all shapes and sizes and can be customized in many ways. FIG. 2 show an example 200 of five different firewall rules. Rule 205 blocks all data network traffic (incoming and outgoing directions) related to Google's public domain name service. Rule 210 blocks all traffic (incoming and outgoing) related to a free domain name service provided by Cloudflare/APNIC. Rule 215 allows all IPv4 UDP all traffic (incoming and outgoing) to pass through the firewall. Rule 220 blocks all IPv4 TCP traffic (incoming and outgoing) destined to a private network defined by class C IP address 192.168.1.0/24. Finally, rule 225 blocks all traffic (incoming and outgoing) from applications in the directory /usr/local/bin/*.

A careful inspection of the rules in FIG. 2 shows that the criteria in each rule can vary, as can the expression of each criterion, the number of criteria, and the order of criteria. Thus, at block 710, embodiments parse the rules, decomposing the rules into their constituent parts—i.e., decomposing the rules into the various criteria that make up each rule—and, at block 715, normalize or standardize the rules so that they comprise the same number and order of criteria, thereby generating a set of ordered rules.

FIG. 3 shows an example of a set of ordered rules 300 derived from the plurality of rules in example 200, in which each rule 205, 210, 215, 220 and 225 is decomposed at block 710 into one or more criterion, and then modified or translated and its criteria sequenced at block 715, as may be needed, so that each rule includes all the same criteria, expressed in the same manner, and in the same order, resulting in ordered rules 305, 310, 315, 320 and 325.

Thus, FIG. 3 shows five ordered rules 305, 310, 315, 320 and 325 each comprising the same eight criteria in the same order or sequence: direction of data flow 330 (incoming, outgoing, or both), family (or version) of OSI Network Layer Protocol 335, Transport Layer Protocol 340, remote port 345, remote IP address 350, local port 355, local IP address 360, and OSI Application layer (e.g., filename of application) 365. If the parsing of a particular rule in block 710 fails to identify a particular criterion, then that criterion is still added to the corresponding ordered rule but with a null or wildcard value assigned to that criterion. Thus, for example, ordered rule 305 corresponds to rule 205. Rule 205 does not specify a value for remote port 345, local IP address 360, or application layer 365, so the value assigned to each of those criteria in ordered rule 305 is a null value or a wildcard value, i.e., a don't care value.

FIG. 3 shows how the plurality of rules 205 are decomposed into the same criteria and re-sequenced in the same order of criteria to create a list of "ordered rules", for example, with identically expressed and ordered criteria. For example, rules 205 and 210 are similar, even if worded slightly differently, e.g., rule 205 refers first to "Google" and then to a "public domain name service" while rule 210 refers to a "free domain name service" and then a different service provider that offers that service, namely, Cloudflare/APNIC. Thus, corresponding ordered rules 305 and 310 express the same values for the same criteria in the same order but differ in terms of the remote IP address criterion 350, which differs between the two rules since the domain name services are provided by different service providers located at different IP addresses on the Internet.

The ordered rules illustrated in FIG. 3 each include an associated precedence criterion 370 and an associated action criterion 375 to be taken if the rule matches or is applied to a received flow that meets all the other criteria in the ordered rule. In one embodiment, the value of the precedence criterion for a particular ordered rule in the set of ordered rules 300 may be assigned a value that is inherent based on the location or designation of the corresponding rule in the plurality of rules 200. For example, the first rule 205 in the plurality of rules 200 may have the highest precedence, as indicated by the lowest precedence value of 1 for the precedence criterion 370 of corresponding ordered rule 305 in the set of ordered rules 300, and the second rule 210 in the plurality of rules 200 may have the next highest precedence as indicated by the next lowest precedence value of 2 for the precedence criterion 370 of the corresponding ordered rule 310 in the set of rules 300. Alternatively, each rule in the plurality of rules 200 may be tagged or assigned a precedence value based on other factors, such as a threat level associated with a flow that matches the rule or the frequency or timing of the occurrence of a flow that matches the rule. Yet further alternatively, the precedence value, whether associated with a rule in the plurality of rules 200, or not, may be assigned or modified when the rule is translated into a corresponding ordered rule and inserted into the set of ordered rules 300. In any case, the ordered rule that is to be selected and the corresponding action 375 to be taken, if more than one ordered rule matches an incoming flow of data, is to be the ordered rule with the highest associated precedence value.

According to embodiments described herein, the precedence criterion 370 and the action criterion 375 are the last two criteria in the sequence of criteria that comprise the set of ordered rules 300. Thus, when the trie is created based on the set of ordered rules 300, these two criteria are represented by leaf nodes in the trie. In this manner, computational resources are not used to look up the precedence value and action to be taken for a particular ordered rule unless all the other criteria in the ordered rule matches an incoming flow of data.

With further reference to FIG. 7, once the criteria for all the rules 200 are ordered at block 715 into the set of ordered rules 300, block 720 generates a prefix tree data structure using the ordered rules 300 as input. An example of a trie 400 with nodes representing all the criteria in the set of ordered rules 300 is illustrated in FIG. 4. First, a root node 405 is created. Then, a single node with the value "BOTH" that represents the value for the first criterion in the set of ordered rules, the direction criterion 330, is created and linked to the root node 405. Since all the ordered rules in the set share the same value for the direction criterion 300, just a single node can be created that represents the value of that criterion for all the ordered rules in the set 300. Next, two nodes that represent the different values of "IPv4" and the wildcard value ("*") for the second criterion among the ordered rules in the set of ordered rules, the family criterion 335, are created and linked to the parent node that represents the direction criterion 330. Since the first four rules 305, 310, 315 and 320 in the set 300 share the same value of "IPv4" for the family criterion 335, a single node can represent the value of that criterion for those rules in the set 300. However, since the last rule 325 in the set 300 is assigned a different value, a wildcard value ("*"), for the family criterion 335, a second node at the same level in the trie is created to represent the value of that criterion for ordered rule 325 and linked to the parent node representing the direction criterion 330. The rest of the trie is created in like manner, with nodes representing the values for the protocol criterion 340, remote port criterion 345, remote IP address criterion 350, local port criterion 355, local IP address criterion 360 and application layer criterion 365.

Nodes in the trie are combined, where possible. For example, three ordered rules 305, 310 and 315 in the set 300 share the same value of "UDP" for the protocol criterion 340, so a single node can represent the value of that criterion for those rules in the set 300. This is possible only when the prefix represented by the parent nodes in the tree for those rules is the same. However, contrast this example with the two ordered rules 305 and 310 in the set 300 that share the same value of "443" for the local port criterion 355. A single node cannot represent the value of that criterion for those rules in the set 300 because the prefix represented by the parent nodes in the trie differs for those rules. In particular, the parent nodes that represent the remote IP address criterion 350 are assigned different values—different IP addresses—which is why the trie branches into separate nodes representing the different IP addresses for those two rules. Once the trie branches, nodes added to the trie below the branch, even if representing the same values, are not combined.

At the bottom of the trie 400, one or more nodes may be appended to represent the precedence criterion for each ordered rule and the action criterion to be taken for each ordered rule. As previously mentioned, the associated precedence for each of the plurality of rules may be stored in a leaf node of the linked plurality of nodes corresponding to each of the plurality of rules to avoid the need for another lookup. Alternatively, the precedence criterion could be stored in a different manner, such as a separate hash table, or encoded as a property of the leaf criterion nodes. Likewise, the associated action for each of the plurality of rules (e.g., forwarding or discarding a data flow) may be stored in a leaf node of the linked plurality of nodes corresponding to each of the plurality of rules, or stored in a different manner, such as a separate hash table, or encoded as a property of the leaf criterion nodes Trie 400 can be further optimized by removing the nodes in the trie that represent wildcard or null values assigned to various criteria of the ordered rules in the set 300. FIG. 5 shows a trie 500 constructed according to the same processes described above with respect to FIG. 4, but the nodes representing null values having been removed, or not added to the trie in the first place. Nodes above and below where the null node would otherwise be positions are directly linked together. Thus, since all the ordered rules in set 300 are assigned a null value for the remote port criterion 345, the three nodes at that level in the trie 400 are removed, or do not exist, in the trie 500, and the parent nodes in the trie 500 that represent values for the protocol criterion 340 are directly linked to children nodes in the trie 500 that represent values for the remote IP address criterion 350. As a result, ordered rule 305 is organized in the trie according to the eight linked nodes (excluding the root node) representing the direction 330, family 335, protocol 340, remote IP 350, local port 355, precedence 370 and action 375 criteria, as indicated by the branch labeled 305 in trie 500; ordered rule 310 is organized in the trie according to the seven linked nodes representing the direction 330, family 335, protocol 340, remote IP 350, local port 355, precedence 370 and action 375 criteria, as indicated by the branch labeled 310 in trie 500; ordered rule 315 is organized in the trie according to the five linked nodes representing the direction 330, family 335, protocol 340, precedence 370 and action 375 criteria, as indicated by the branch labeled 315 in trie 500; ordered rule 320 is organized in the trie according to the seven linked nodes representing the direction 330, family 335, protocol 340, remote IP 350, local IP address 360, precedence 370 and action 375 criteria, as indicated by the branch labeled 320 in trie 500; and ordered rule 325 is organized in the trie according to the four linked nodes representing the direction 330, application layer 365, precedence 370 and action 375 criteria, as indicated by the branch labeled 325 in trie 500.

Figure 8:
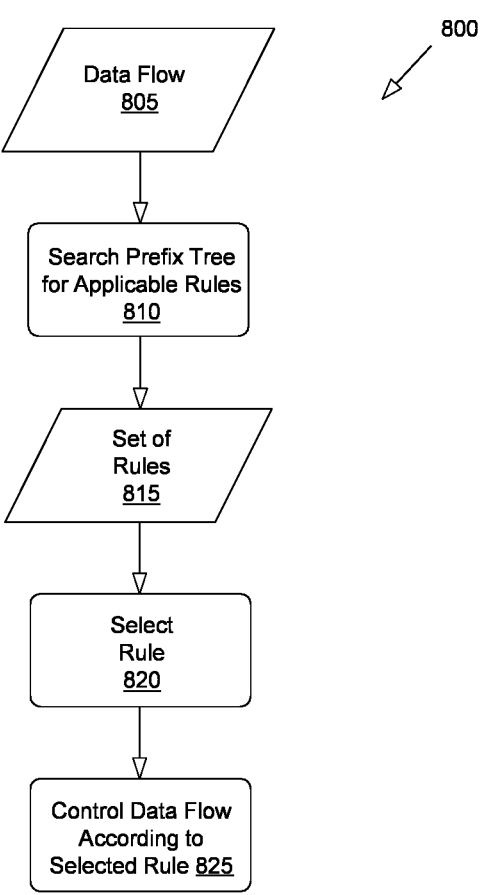
FIG. 8 is a flowchart for searching and identifying zero or more rules in the prefix tree structure, and then selecting one of those rules to control a flow of data between two computing resources.

Once a trie of rules 125 is created, or updated or revised, according to the process described above with reference to FIG. 7, the trie may be deployed for use. A firewall device can then search the trie to find and select a rule in the trie that matches, or may be applied to, a received flow of data. With reference to FIG. 6 and flowchart 800 illustrated in FIG. 8, the process begins at block 805 with receiving a flow of data, for example, an incoming data packet is received at the firewall device. The firewall device inspects the packet and identifies the values of various fields in the header and/or data portions of the data packet and then searches at block 810 for one or more rules in the trie 600 that applies to a data packet with these values.

As an example, assume the data packet is an incoming UDP/IP data packet. The IP header version field in the data packet indicates the data packet is an IP version 4 data packet, the IP header protocol field in the data packet indicates the transport layer protocol is UDP, the IP header source address field in the data packet indicates a source IP address of 8.8.8.8, and the IP header destination address field in the data packet indicates a destination IP address of 192.168.1.42. The UDP header source port field indicates a source port value of 443 and the UDP header destination port field indicates a destination port value of 443. Finally, the application layer field or portion of the data packet that is interpreted as the application layer indicates the data packet relates to a communication involving a Safari web browser application.

Given this information gleaned from the incoming data packet, the firewall searches the trie 600 for one or more rules that match or apply to the data packet, so that a decision can be made to discard or forward the data packet according to a selected rule, and a corresponding action taken according to the selected rule. The search starts at the root node 405 and searches the trie 600, depth-first (starting at the root node or selecting some arbitrary node as the root node in the case of a graph) and exploring as far as possible along each branch before backtracking and exploring another branch), for a direction criterion 330 node whose value matches or applies to the "incoming" direction of travel for the data packet (i.e., the data packet is being transmitted in the direction from an external network or computing resource to an internal network or computing device that is inside, and therefore protected by, the firewall)

.

A direction criterion 330 node assigned the value of "BOTH" exists at the first level of the trie 600. This value applies to both incoming and outgoing data transmission, so the comparison of the direction of travel of the data packet (an incoming data packet) with the value of "BOTH" for the direction criterion node 330 evaluates to "true", and the search continues down to the next level in the trie 600, as denoted by the dotted line 605 starting at the root node 405 and proceeding to a family criterion node 335. The searching continues, now searching for a family criterion node 335 that matches or applies to the IPv4 of the data packet. The comparison of "IPv4" for the data packet with the value of "IPv4" for the family criterion node 335 evaluates to "true", so, again, the search continues down to the next level in the trie 600 to the protocol criterion node 340, denoted by the dotted line 600 proceeding to a protocol criterion node 340.

The search continues for a protocol criterion 340 node whose value matches or applies to the "UDP" transport protocol identified in the data packet. A protocol criterion 340 node assigned the value of "UDP" exists at the third level of the trie 600, so the comparison of the "UDP" transport protocol identified in the data packet with the value of "UDP" for the leftmost protocol criterion node 340 evaluates to "true", and the search continues from the "UDP" node to subsequent nodes in the trie as denoted by dotted line 605. In this same manner, a comparison of values from the data packet with the corresponding values of all the nodes in the trie 600 down along the branch labeled 305 and corresponding to ordered rule 305 evaluate to "true", and so a first rule is found in the trie 600 that applies to the incoming data packet.

The search then backtracks to the beginning of the next branch in the trie 600, located at the remote IP address criterion node assigned the value 1.1.1.1/32. The comparison of that value with the source IP address of 8.8.8.8 in the data packet evaluates to "false", so the remainder of that branch of the trie is not searched further, as denoted by the absence of the dotted line 605 along the branch labeled 310, and the search backtracks again to the next branch 315 in the trie 600 the beginning of which is located at the remote IP address criterion node 350 assigned the wildcard, or don't care, value ("*"). Since the value of the remote IP address criterion node 350 that is assigned the wildcard value applies to any remote IP address, the comparison of the value with the source IP address of 8.8.8.8 in the data packet evaluates to "true", and the search continues down along the branch labeled 310 and corresponding to ordered rule 310 to the end of the branch, as denoted by the dotted line 605 and so a second rule is found in the trie 600 that applies to the incoming data packet.

The search backtracks again to the beginning of the next branch in the trie 600, the beginning of which is located at the protocol criterion node assigned the value "TCP". The comparison of the "UDP" transport protocol identified in the data packet with the value of "TCP" for the rightmost protocol criterion node 340 evaluates to "false", and so no further searching in that branch is performed, and the search backtracks to the next (and, as it turns out in this example, the last) branch in the trie 600 the beginning of which is located at the protocol criterion node 350 assigned the wildcard, or don't care, value ("*"). Since the value of the protocol criterion node 340 that is assigned the wildcard value applies to any protocol value, the comparison of the value with the protocol value of IPv4 in the data packet evaluates to "true", and the search continues down along the branch labeled 325 and corresponding to ordered rule 325 to the next node in the branch, the application layer criterion 370 node. The application with which the data packet is associated, "Safari", does not match the value of the application layer criterion 370 node in branch 325 (which is any program in the local directory, such as /usr/local/bin/), so the comparison evaluates to "false". The search then backtracks all the way back to the root node, signifying the end of the search for rules in the trie 600 that apply to the incoming data packet.

In the above example, two rules 305 and 310 were found in the trie 600 that match or apply to the incoming data packet. These search results are output at block 815 as the set of rules, along with their corresponding precedence criterion 370 values and action criterion 375 values. A decision can now be made to take some action with regard to the data packet based on at least one of the rules in the set of rules. Since each rule has its own precedence value, block 820 selects a rule from the set of rules output at block 815 that has the higher or highest precedence value. In this example, rule 305 has a precedence value of 1 indicating a higher precedence value than rule 315 with a precedence value of 3. Thus, block 820 selects rule 310 to control the action to be taken on the incoming data packet. The action criterion 375 for rule 305 is set to a value of "DENY", so, at block 825, the firewall takes appropriate action—in this case, the incoming data packet is not allowed through the firewall to its intended destination and instead it is discarded.

Figure 9:
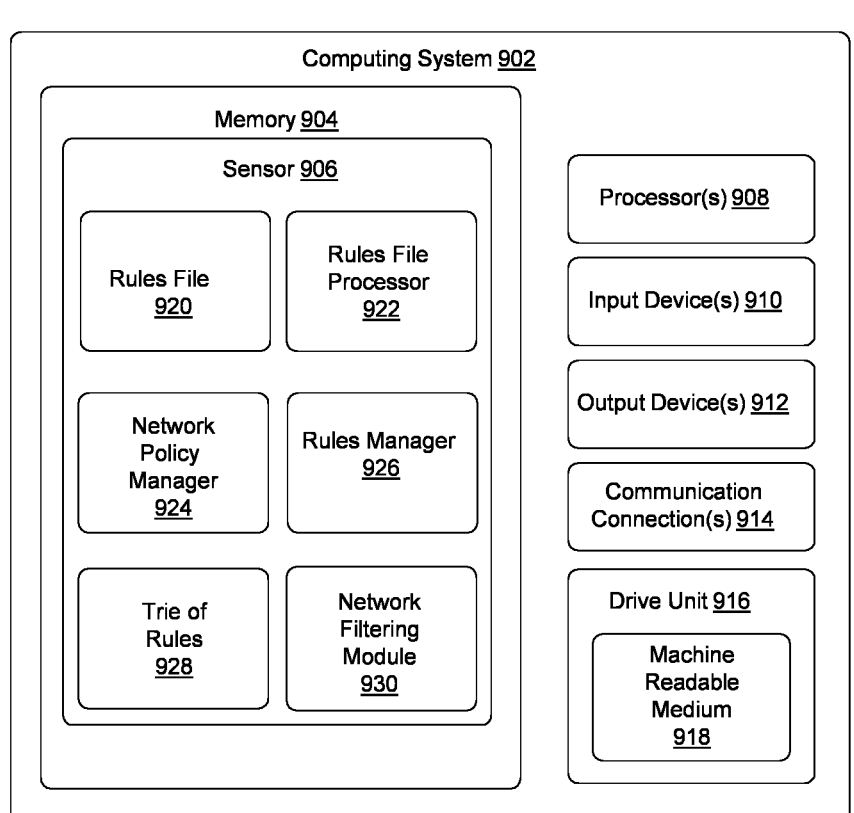
FIG. 9 shows an example system architecture for a computing system associated with a firewall device according to the embodiments described herein.

FIG. 9 shows an example system architecture 900 for a computing system 902 associated with the firewall device 110 described herein. The computing system 902 can be a server, computer, or other type of computing device that executes one or more firewall devices. In some examples, the firewall device can be executed by a dedicated computing system 902. In other examples, the computing system 902 can execute one or more firewall devices via virtual machines or other virtualized instances. For instance, the computing system 902 may execute multiple firewall devices in parallel, using different virtual machines, parallel threads, or other parallelization techniques, for multiple customers.

The computing system 902 can include memory 904. In various examples, the memory 904 can include system memory, which may be volatile (such as RAM), non-volatile (such as ROM, flash memory, non-volatile memory express (NVMe), etc.) or some combination of the two. The memory 904 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information, and which can be accessed by the computing system 902. Any such non-transitory computer-readable media may be part of the computing system 902.

The memory 904 can store data associated with a sensor or security agent 906 which can provide firewall device functionality, including receiving and storing a rules file 920, operating a rules file processor 922 that manages the rules file, a network policy manager 924 that parses and orders rules according to the same criteria, operating a rules manager 926 that, using the contents of the rules file 920 as input, creates a trie of rules 928, and a network filtering module 930 that makes filtering decisions, i.e., whether to forward or discard a data flow based on a selected rule in the trie of rules that applies to or matches the content of the data flow. The memory 904 can also store other modules and data that can be utilized by the computing system 902 to perform or enable performing the actions described herein. Such other modules and data can include a platform, operating system, and applications, and data utilized by the platform, operating system, and applications.

By way of a non-limiting example, the computing system 902 that executes the firewall device 110 may have non-volatile memory, such as an NVMe disk configured to store a trie of rules. The computing system 902 that executes the firewall 110 may also have volatile memory, such as synchronous dynamic RAM (SDRAM), double data rate (DDR) SDRAM, DDR2 SDRAM, DDR3 SDRAM, or DD4 SDRAM.

The computing system 902 can also have one or more processors 908. In various examples, each of the processors 908 can be a central processing unit (CPU), a graphics processing unit (GPU), both a CPU and a GPU, or any other type of processing unit. For example, each the processors 908 may be a 10-core CPU, or any other type of processor. Each of the one or more processors 908 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processors 908 may also be responsible for executing computer applications stored in the memory 904, which can be associated with types of volatile and/or non-volatile memory.

The computing system 902 can also have one or more communication interfaces or connections 914. The communication interfaces 914 can include transceivers, modems, interfaces, antennas, telephone connections, and/or other components that can transmit and/or receive data over networks, telephone lines, or other connections. For example, the communication interfaces 914 can include one or more network cards that can be used to receive a data flow and/or output a data flow filtered according to the firewall device 110.

In some examples, the computing system 902 can also have one or more input devices 910, such as a keyboard, a mouse, a touch-sensitive display, voice input device, etc., and/or one or more output devices 912 such as a display, speakers, a printer, etc. These devices are well known in the art and need not be discussed at length here.

The computing system 902 may also include a drive unit 916 including a machine readable medium 918. The machine readable medium 918 can store one or more sets of instructions, such as software or firmware, that embodies any one or more of the methodologies or functions described herein. The instructions can also reside, completely or at least partially, within the memory 904, processor(s) 908, and/or communication interface(s) 914 during execution thereof by the computing system 902. The memory 904 and the processor(s) 908 also can constitute machine readable media 918.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method performed at a firewall device, comprising:

receiving a plurality of rules for controlling a flow of data between computing resources;

identifying a respective set of criteria that exists in each of the plurality of rules, wherein a number and a sequence of the respective set of criteria in one rule of the plurality of rules differs from a number and a sequence of the respective set of criteria in another rule of the plurality of rules;

selecting a respective subset of the respective set of criteria that exists in each of the plurality of rules and that exists in common across each of the plurality of rules, resulting in an identical respective subset of the respective set of criteria for each of the plurality of rules;

ordering in an identical sequence the criteria in the identical respective subset of the respective set of criteria for each of the plurality of rules, resulting in a revised plurality of rules where in each rule in the revised plurality of rules comprises a same number of criteria that are sequenced in a same order;

storing the revised plurality of rules in a memory accessible to the firewall device, organized as a prefix tree data structure comprising a linked plurality of nodes corresponding to the revised plurality of rules;

receiving a flow of data from a first computing resource that is destined to a second computing resource;

searching the prefix tree data structure stored in the memory accessible to the firewall device for any rule in the revised plurality of rules that applies to controlling the received flow of data from the first computing resource to the second computing resource;

identifying one or more of the revised plurality of rules in the prefix tree data structure that apply to controlling the received flow of data from the first computing resource to the second computing resource in response to searching the prefix tree data structure for any rule in the revised plurality of rules that applies to controlling the received flow of data from the first computing resource to the second computing resource;

selecting a rule in the identified one or more of the revised plurality of rules to control the received flow of data from the first computing resource to the second computing resource; and controlling the received flow of data from the first computing resource to the second computing resource according to the selected rule.

2. The computer-implemented method of claim 1, wherein ordering in the identical sequence the criteria in the identical respective subset of the respective set of criteria for each of the plurality of rules, resulting in the revised plurality of rules where in each rule in the revised plurality of rules comprises the same number of criteria that are sequenced in the same order is performed to optimize searching the prefix tree data structure for any rule in the revised plurality of rules that applies to controlling the flow of data between computing resources.

3. The computer-implemented method of claim 1, wherein selecting the rule in the identified one or more of the revised plurality of rules to control the received flow of data from the first computing resource to the second computing resource comprises selecting the rule in the identified one or more of the revised plurality of rules to control the received flow of data from the first computing resource to the second computing resource based on an associated precedence value for the rule.

4. The computer-implemented method of claim 3, further comprising storing an associated precedence for each rule in the revised set of rules in one of a leaf node of the linked plurality of nodes corresponding to the rule and an entry in a hash lookup table associated with the prefix tree data structure.

5. The computer-implemented method of claim 1, wherein controlling the received flow of data from the first computing resources to the second computing resource according to the selected rule comprises taking an action with respect to the received flow of data, the action selected from a group of actions consisting of: blocking transmission, and allowing transmission, of the received flow of data from the first computing resource to the second computing resource according to the selected rule.

6. The computer-implemented method of claim 5, further comprising storing an associated action for each rule in the revised plurality of rules in a leaf node of the linked plurality of nodes corresponding to the rule.

7. A computing system, comprising:

one or more processors;

a memory storing computer-executable instructions that, when executed by the one or more processors, cause the one or more processors to perform operations comprising:

receiving at the computing system a plurality of rules for controlling a flow of data between computing resources;

identifying a respective set of criteria that exists in each of the plurality of rules, wherein a number and a sequence of the respective set of criteria in one rule of the plurality of rules differs from a number and a sequence of the respective set of criteria in another rule of the plurality of rules into a respective sequence of criteria;

selecting a respective subset of the respective set of criteria that exists in each of the plurality of rules and that exists in common across each of the plurality of rules, resulting in an identical respective subset of the respective set of criteria for each of the plurality of rules;

ordering in an identical sequence the criteria in the identical respective subset of the respective set of criteria for each of the plurality of rules, resulting in a revised plurality of rules wherein each rule in the revised plurality of rules comprises a same number of criteria that are sequenced in a same order; and storing the revised plurality of rules in the memory, organized as a prefix tree data structure comprising a linked plurality of nodes corresponding to the revised plurality of rules;

receiving at the computing system a flow of data from a first computing resource that is destined to a second computing resource;

searching the prefix tree data structure stored in the memory for any rule in the revised plurality of rules that applies to controlling the received flow of data from the first computing resource to the second computing resource;

identifying at the computing system one or more of the revised plurality of rules in the prefix tree data structure that apply to controlling the received flow of data from the first computing resource to the second computing resource in response to searching the prefix tree data structure for any rule in the revised plurality of rules that applies to controlling the received flow of data from the first computing resource to the second computing resource;

selecting at the computing system a rule in the identified one or more of the revised plurality of rules to control the received flow of data from the first computing resource to the second computing resource; and controlling at the computing system the received flow of data from the first computing resource to the second computing resource according to the selected rule.

8. The computing system of claim 7, wherein ordering in the identical sequence the criteria in the identical respective subset of the respective set of criteria for each of the plurality of rules, resulting in the revised plurality of rules wherein each rule in the revised plurality of rules comprises the same number of criteria that are sequenced in the same order is performed to optimize searching the prefix tree data structure for any rule in the revised plurality of rules that applies to controlling the flow of data between computing resources.

9. The computing system of claim 7, wherein selecting at the computing system the rule in the identified one or more of the revised plurality of rules to control the received flow of data from the first computing resource to the second computing resource comprises selecting the rule in the identified one or more of the revised plurality of rules that has a highest precedence among the rules in the identified one or more of the revised plurality of rules to control the received flow of data from the first computing resource to the second computing resource.

10. The computing system of claim 7, wherein controlling at the computing system the received flow of data from the first computing resources to the second computing resource according to the selected rule comprises taking an action at the computing system with respect to the received flow of data, the action selected from a group of actions consisting of: blocking transmission, and allowing transmission, of the received flow of data from the first computing resource to the second computing resource according to the selected rule.

11. One or more non-transitory computer-readable media storing computer-executable instructions for an event query host that, when executed by one or more processors, cause the one or more processors to perform operations comprising:

receiving at the event query host a plurality of rules for controlling a flow of data between computing resources;

identifying a respective set of criteria that exists in each of the plurality of rules into a respective sequence of criteria, wherein a number and a sequence of the respective set of criteria in one rule of the plurality of rules differs from a number and a sequence of the respective set of criteria in another rule of the plurality of rules;

selecting a respective subset of the respective set of criteria that exists in each of the plurality of rules and that exists in common across each of the plurality of rules, resulting in an identical respective subset of the respective set of criteria for each of the plurality of rules:

ordering in an identical sequence the criteria in the identical respective subset of the respective set of criteria for each of the plurality of rules, resulting in a revised plurality of rules wherein each rule in the revised plurality of rules comprises a same number of criteria that are sequenced in a same order; storing the revised plurality of rules in a memory accessible to the event query host, organized as a prefix tree data structure comprising a linked plurality of nodes corresponding to the revised plurality of rules;

receiving at the event query host a flow of data from a first computing resource that is destined to a second computing resource; searching the prefix tree data structure stored in the memory accessible to the event query host for any rule in the revised plurality of rules that applies to controlling the received flow of data from the first computing resource to the second computing resource;

identifying at the event query host one or more of the revised plurality of rules in the prefix tree data structure that apply to controlling the received flow of data from the first computing resource to the second computing resource in response to searching the prefix tree data structure for any rule in the revised plurality of rules that applies to controlling the received flow of data from the first computing resource to the second computing resource;

selecting at the event query host a rule in the identified one or more of the revised plurality of rules to control the received flow of data from the first computing resource to the second computing resource; and controlling at the event query host the received flow of data from the first computing resource to the second computing resource according to the selected rule.

12. The one or more non-transitory computer-readable media of claim 11, wherein ordering in the identical sequence the criteria in the identical respective subset of the respective set of criteria for each of the plurality of rules, resulting in the revised plurality of rules wherein each rule in the revised plurality of rules comprises the same number of criteria that are sequenced in the same order is performed to optimize searching the prefix tree data structure for any rule in the revised plurality of rules that applies to controlling the flow of data between computing resources.

13. The one or more non-transitory computer-readable media of claim 11, wherein selecting at the event query host the rule in the identified one or more of the revised plurality of rules to control the received flow of data from the first computing resource to the second computing resource comprises selecting the rule in the identified one or more of the revised plurality of rules that has a highest precedence among the rules in the identified one or more of the revised plurality of rules to control the received flow of data from the first computing resource to the second computing resource.

14. The one or more non-transitory computer-readable media of claim 11, wherein controlling at the event query host the received flow of data from the first computing resources to the second computing resource according to the selected rule comprises one of blocking transmission and allowing transmission of the received flow of data from the first computing resource to the second computing resource according to the selected rule.

* * * * *